UNITED STATES PATENT OFFICE.

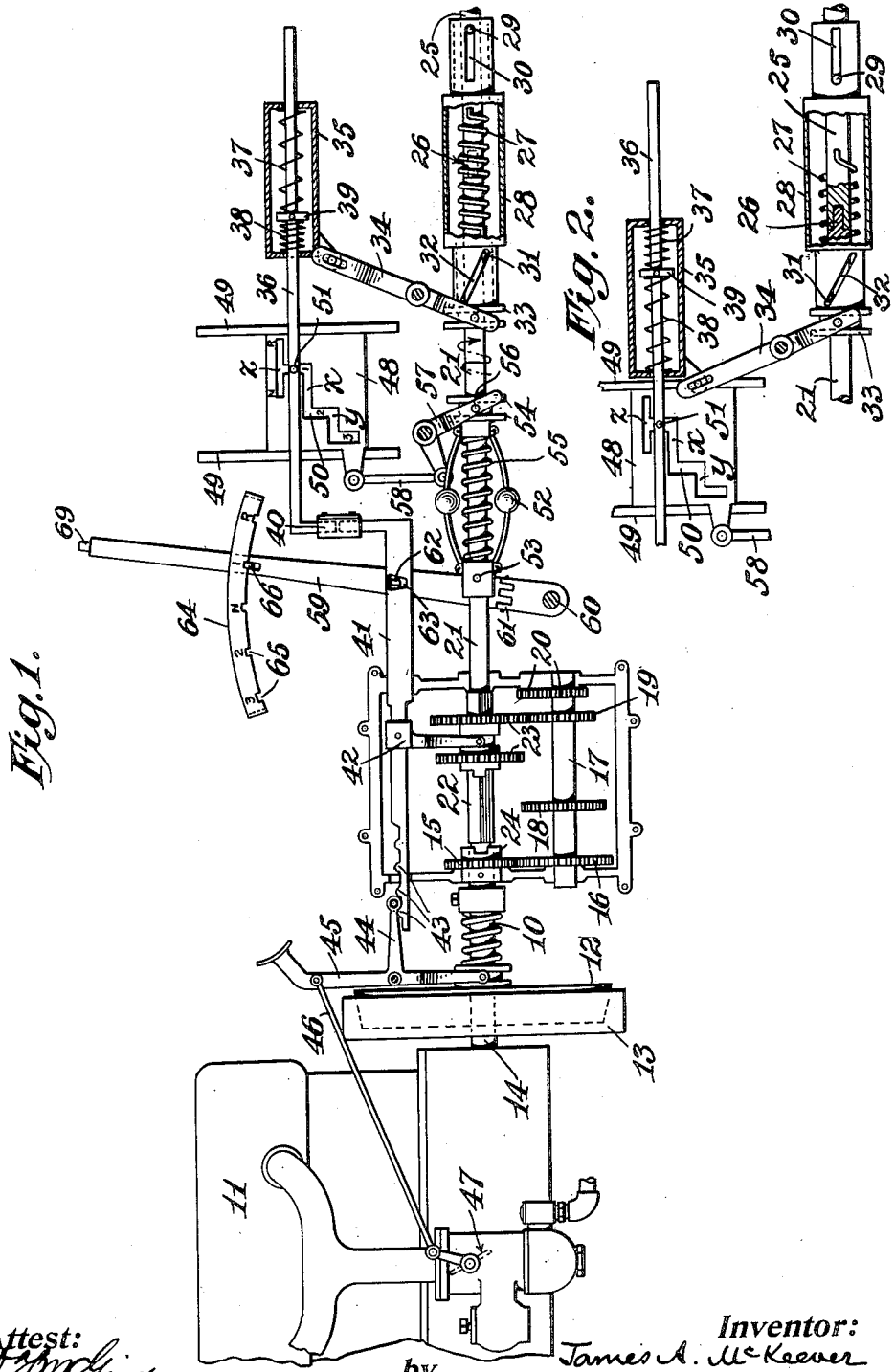

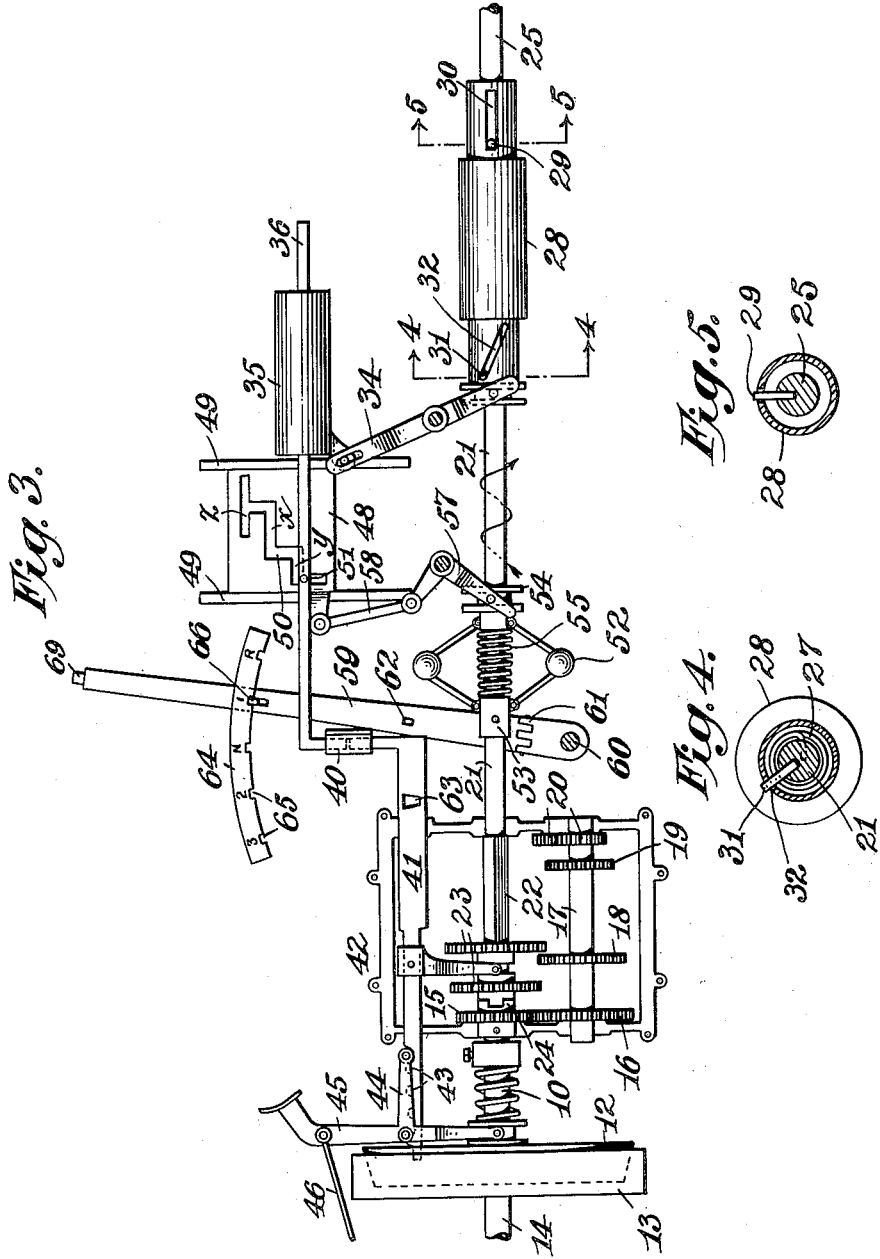

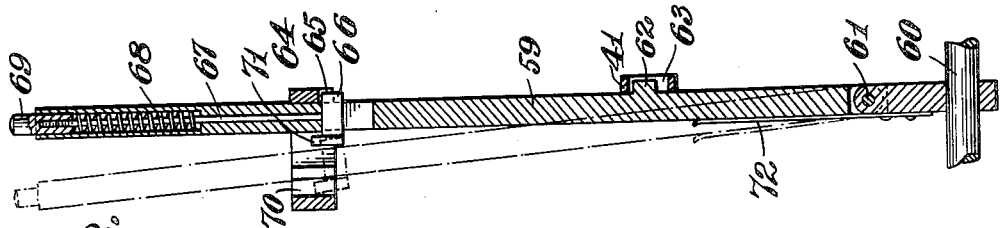
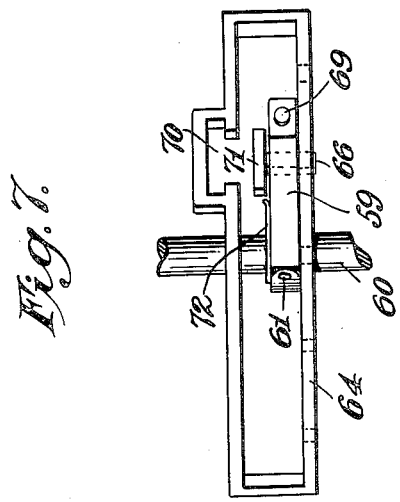
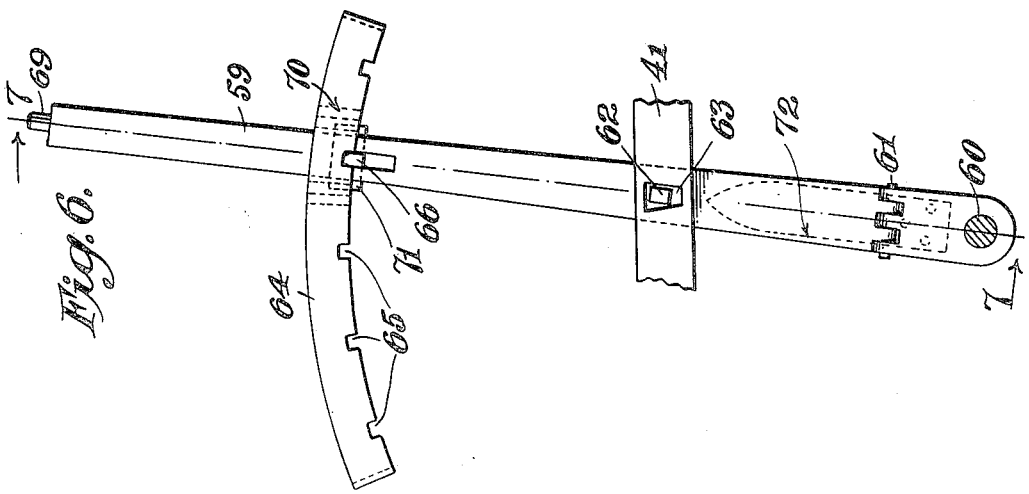

JAMES A. McKEEVER, OF NEW YORK, N. Y.

AUTOMATIC CHANGE-SPEED DEVICE.

1,137,507.

Specification of Letters Patent. Patented Apr. 27, 1915.

Application filed September 3, 1914. Serial No. 860,016.

*To all whom it may concern:*

Be it known that I, JAMES A. McKEEVER, a citizen of the United States of America, and residing in the city, county, and State of New York, have invented a certain new and Improved Automatic Change-Speed Device, of which the following is a specification.

My invention relates to automatic gear shifting devices and more particularly to means for automatically shifting the drive connection in accordance with variations in speed induced by variations in load.

While the invention is designed especially for use with automobiles, it may be applied to shafts of any sort which are subject to variable load and provided with variable drive connections.

In the acompanying drawings, Figure 1 is a longitudinal elevation of a drive shaft and its operative connections more or less diagrammatically shown and partially in section, in which my invention is embodied in one form; the gear is at low speed and the shafts are still under torque; Fig. 2 is a similar view of some of the parts in this position of the gears but with the torque released. This is normal starting position; Fig. 3 is an elevation similar to Fig. 1 showing the parts in position at high speed under normal load; Figs. 4 and 5 are sections on the lines 4—4, 5—5, respectively, Fig. 3; Fig. 6 is a side elevation of the hand operating lever; Fig. 7 is a plan thereof; and Fig. 8 a section therethrough.

The use of an automatic change of the drive connection to compensate varying load is already known. So far as I am aware, however, these prior devices have operated in such a manner that the change of gear ratio occurs at once upon decrease or increase of load (or torque) irrespective of speed change. The opening of the throttle, for instance, or declutching momentarily would bring about an undesired change of gears. The object of the present invention is to provide an automatic change of the drive connection upon variation of torque, but controlled by change of speed. To this end I provide a locking device operated from a centrifugal element such as a governor which controls the drive change connection in accordance with the speed of the drive.

The shaft 10 is driven as usual from the engine 11 through clutch cone 12 engaging the clutch bell 13 on the crank shaft 14. The pinion 15 on the end of shaft 10 meshes with gear 16 on the counter-shaft 17 carrying change speed gears 18 and 19 and reversing gears 20, all as well known. Shaft 21 has on its squared end 22 sliding gears 23 adapted to mesh with either of the gears 18, 19 or 20 and adapted to be clutched with the clutch boss 24 on pinion 15 for the direct high speed drive. The independent shaft 25 forms an extension of the shaft 21 and is centered with relation thereto by a pin and socket joint 26. The two shafts are operatively connected together through the torque spring 27 one end of which is secured to the shaft 21 and the opposite end to the shaft 25. This spring is of sufficient strength to take the drive under ordinary load without material flexure. Under abnormal load, however, the spring will yield somewhat, thus causing slight relative rotary movement of the shafts 21 and 25 with relation to each other. This relative rotary movement is utilized to shift the drive connection and to this end a sleeve 28 is arranged over the abutting ends of the shafts 21 and 25. This sleeve is slidably connected to shaft 25 in any suitable manner, as by a pin 29 in the shaft working in a slot 30 in the sleeve, so that while the sleeve rotates with the shaft it is free to slide longitudinally thereon. The pin 31 in the shaft 21 works in the tangential slot 32 in the opposite end of the sleeve. Since the shafts are not longitudinally separable, it is obvious that the relative rotation thereof, on the lag of shaft 25 under abnormal load, causes the sleeve 28 to slide toward the left, through the action of the pin 31 in the tangential slot 32, taking the position shown in Fig. 1. This longitudinal movement of the sleeve 28 is transmitted through trunnion 33 and lever 34 to the spring box 35 mounted on the rod 36 of the change drive connection and inclosing springs 37 and 38 on opposite sides of the abutment 39 on the rod. This arrangement thus affords a yielding connection between the rod 36 and the sleeve 28, so that upon the movement of the latter to the left, as above explained, the lever 34 moves the spring box 35 to the right and (if the rod 36 is held stationary) places the spring 38 under tension. In starting position and when the low speed gears are in mesh with only normal torque before the shafts have attained the predetermined rate of speed at which the change to higher speed gears takes place (Fig. 2), spring 37 is under tension. This spring, 37, has sufficient throw to shift the rod 36 to the high speed position (Fig. 3).

The rod 36 is connected at 40 to the gear shifting bar 41, carrying the fork 42 which engages the sliding gear 23. A prolongation of the bar 41 is provided with cams 43 over which rides a roller on the arm 44 of the clutch pedal 45. These cams 43 are so arranged that the clutch cone 12 is withdrawn immediately preceding any of the gear shifts, thus safeguarding the gears against injury. A connection at 46 from the pedal 45 to the throttle 47 closes the latter when the clutch is withdrawn for the further safeguarding of the gears.

As above stated, my invention contemplates a locking device to prevent the immediate shift of the drive connection upon a variation of torque. In the form here shown this device comprises a locking plate 48 sliding in guides 49 and provided with a stepped slot 50 in which works a pin 51 on the shifting rod 36. The movement of the locking plate is controlled from a centrifugal governor 52 pinned at one end 53 to the shaft 21 and provided at its free end with a trunnion 54. A suitable governor spring 55 tends to force the ends apart. A pin 56 at one end of the bell crank lever 57 engages the trunnion 54, while to the other end of the lever is attached one end of the link 58 pivoted to the locking plate 48. It is obvious that as the governor rises or falls a corresponding motion is imparted to the locking plate 48. Inasmuch as the steps of the slot 50 are predetermined with relation to the position of the governor and also with relation to the position of the pin 51 on the shifting rod 36, it is clear that the latter is not free to act, in spite of the fact that its spring 38 has been placed under tension by the lever 34, until the pin comes opposite one or the other of the portions $x$ or $y$ of the slot 50 (Fig. 3). Consequently the opening of the throttle at any given moment, although obviously increasing the torque, will not have the effect of throwing the drive connection into low speed and the latter will not occur unless the speed is slowed down to such an extent (as for instance, on hill climbing) that the governor 52 moves the locking plate into the position in which the shifting rod may move to the right in $x$ or $y$ as the case may be. For the same reason, declutching or in any other way lessening the torque, while instantly relieving spring 27 from tension and moving trunnion 33 to the right and, through lever 34, moving spring box 35 to the left, compressing spring 37, will not cause the gears to shift, and when power is again applied the same gears will still be in mesh. While the device is shifting from a high to lower set of gears, the cams 43 momentarily release the clutch and throttle the engine. This of course, releases the tension on torque spring 27 and would tend to cause spring box 35 to return to normal position, thereby relieving the pressure on spring 38. The return of spring box 35 however, under the influence of the momentarily released torque spring, may be retarded by friction on the lever 34 (for example, at its bearing) and thereby rendered sufficiently slow to permit the spring 38 to perform its function of shifting gears into the next lower combination. In order that the gear may be shifted by hand, I provide also a hand lever 59, pivoted at 60 and hinged at 61 to permit the upper portion to be swung laterally into or out of engagement with the shifting bar 41. This engagement may be secured in any suitable manner as by a pin 62 on the lever taking into an aperture 63 in the bar 41. The hand lever works in a sector 64 provided with notches 65 engaged by a catch 66, carried by the rod 67 and normally held up into engaging position by the spring 68. A thumb piece 69 is provided by which the rod 67 and catch 66 may be pressed down out of engaging position when the hand lever is shifted in the sector 64. A bay 70 may be formed in the opposite side of the sector to receive the head 71 formed on the back of the catch 66 and engaging in the bay to hold the lever in its disengaged position. The leaf spring 72 normally presses the upper portion of the hand lever 59 into position to permit the catch 66 to engage the notches 65.

The operation of the device is readily understood. Assuming that the machine had been stopped while the gears are meshed in high speed position, (Fig. 3), as is generally the case with motor cars, it is necessary to disengage the gears by means of the hand lever 59. While the locking plate 48 is in position to oppose the return shift of the shifting bar 41 by the hand lever, the governor spring 55 is still tensioned and its tendency is to bring the locking plate 48 back to the position shown in Fig. 1. Consequently, as soon as the pin 51 on shifting rod 36 is moved to the portion of the slot between $x$ and $y$, the locking plate 48 is drawn down by the bell crank lever 57 until the pin reaches slot $x$, whereupon it may be moved through this by the hand lever to the portion of the slot at the right of $x$ in which position the spring 55 again acts to draw the locking plate down to the position shown in Fig. 1. The shifting of the hand lever 59 has moved the rod 36 to the right, thus placing the spring 37 under tension (Fig. 2.). In this position the low speed gears 19 and 23 are in mesh and the clutch 12 may now be thrown in. Rod 36 is held against movement by the locking plate 48. As soon as the shafts attain speed, however, the governor 52 lifts the locking plate 48 so that the rod 36 is automatically shifted by spring 37 to the second speed. Further acceleration lifts the locking plate and the rod 36 is shifted to the highest speed. If, now, an abnormal load is encountered, due to a hill or bad road conditions, the resulting torque has the effect of placing the springs 27 and 38 under tension, but the consequent tendency to shift the gear back into second speed is opposed by the locking plate 48 until the speed of the machine has been reduced sufficiently to permit the governor 52 to move the locking plate down into position in which the pin 51 may travel through the portion $y$ of the slot 50. Like action occurs on further reduction of speed if the shafts are still laboring under abnormal torque, pin 51 traveling through portion $x$ of the slot 50.

In the position shown in Fig. 1. the gears are at low speed, having been shifted automatically by the spring 38. The shafts are still rotating, however, under excessive load and the torque spring 27 is consequently under tension, thus shifting the lever 34 in the direction to compress spring 38. There is no lower speed to which the gears may be shifted, however, and the rod 36 has been moved to the right so far that only slight compression of the spring 38 takes place. If the shafts are now brought to a stop and the clutch thrown out of engagement, the torque spring 27 is relieved and returns the lever 34 to normal position. This moves the spring box 35 to the left, placing spring 37 under its greatest compression so that it is ready to automatically shift the gears to high speed again when the shafts accelerate to a predetermined number of revolutions per minute (Fig. 2). At each shift of the bar 41, one of the cams 43 lifts the arm 44 of the clutch lever, momentarily freeing the clutch and partially closing the throttle during the gear shift. In case of accident to the automatic gear shifting device, the collar 40 may be removed, leaving the gear shift to be wholly operated by means of the hand lever 59. The slot $z$ at the top of the plate 48 permits the gears to be drawn into either neutral or reverse position by means of the hand lever 59 when the car is at rest.

The present invention is not limited to the precise structure shown which comprises merely an illustrative embodiment of what I claim as my invention.

I claim as my invention:—

1. An automatic change speed device, comprising a pair of shafts, a torque device connecting between the same, a change speed mechanism for the shafts, means in connection with said torque device for automatically operating said change speed mechanism, together with a governor rotating with said shafts and means operated thereby for controlling the automatic operation of the change speed mechanism.

2. In an automatic change speed mechanism, a torque-operated change speed device, a locking device controlling the same and a centrifugal governor operating said locking device.

3. In an automatic change speed mechanism, a pair of shafts, a torque device connecting the same, a change speed shifting member, a yielding connection between said torque device and shifting member and a locking device serving to temporarily detain said shifting member.

4. In an automatic change speed mechanism, a pair of shafts, a torque device connecting the same, a change speed shifting bar, an operative connection between the same and the torque device, a locking device engaging said shifting bar, a governor rotating with said shafts, and means in connection therewith for intermittently freeing said shifting bar from the locking device.

5. In an automatic change speed device, a pair of shafts, a torque device connecting the same, a change speed shifting rod operatively connected to the torque device, a governor rotating with said shafts, and means controlled by the governor for detaining the shifting rod, substantially as described.

6. In an automatic change speed device, a pair of shafts, a torque device connecting the same, a change speed shifting rod operatively connected to the torque device, a governor rotating with said shafts, and means controlled by the governor for temporarily detaining the shifting rod, substantially as described.

7. In an automatic change speed device, a pair of shafts, a torque device connecting the same, a change speed shifting rod operatively connected to the torque device, a governor rotating with said shafts, and means controlled by the governor for intermittently and temporarily detaining the shifting rod, substantially as described.

8. An automatic change speed device, comprising a pair of shafts, a torque connection between the same, a variable speed drive therefor, means in connection with said torque device for operating said change speed connection, together with a governor rotating with said shaft and means in connection therewith controlling the automatic operation of the change speed mechanism, in combination with a manually controlled lever and means for operatively connecting the same with the change speed shifting connection to operate the latter.

In testimony whereof I have signed my name to this specification, in the presence of two subscribing witnesses.

JAMES A. McKEEVER.

Witnesses:
RODNEY L. MARCHANT,
HUBERT HOWSON.